June 11, 1940.    G. H. BURTENSHAW    2,203,891
DENTURE DEMONSTRATING APPARATUS
Filed April 16, 1937    4 Sheets-Sheet 1
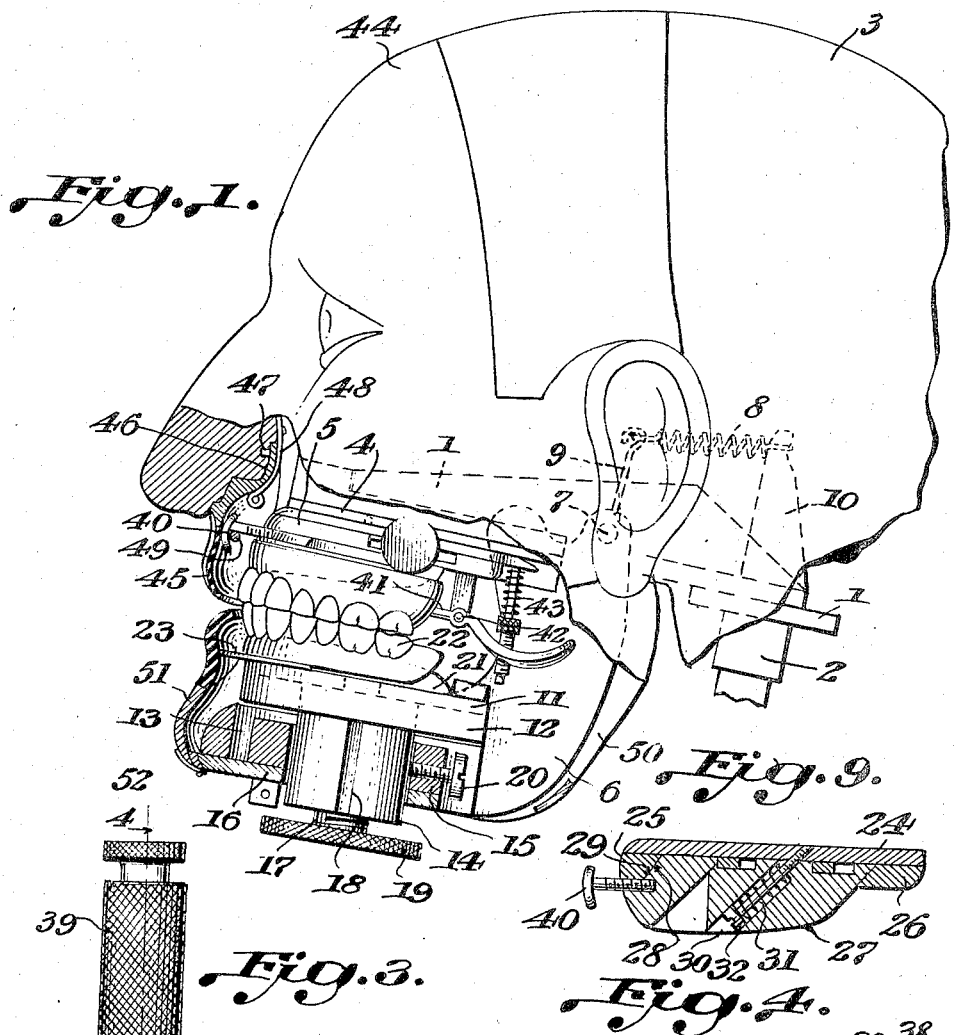
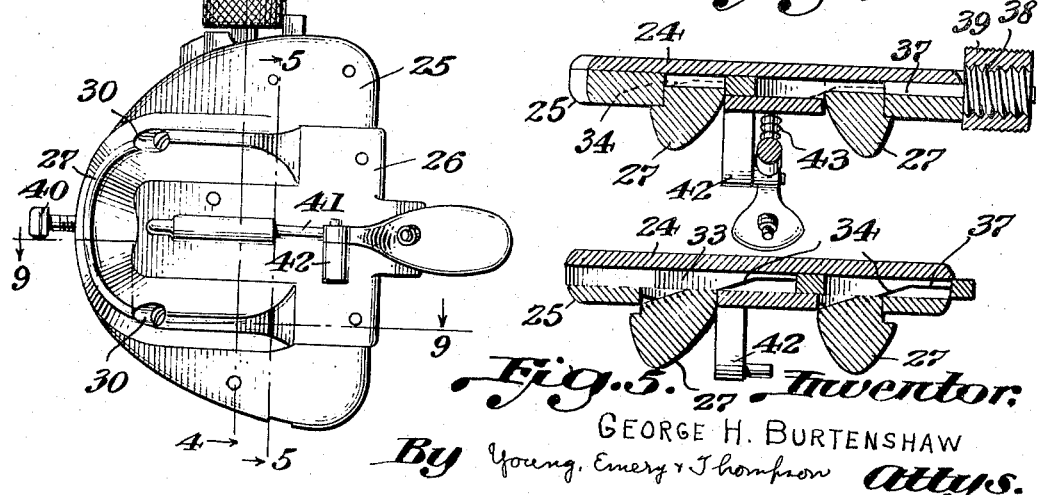
Inventor
GEORGE H. BURTENSHAW
By Young, Emery & Thompson Attys.

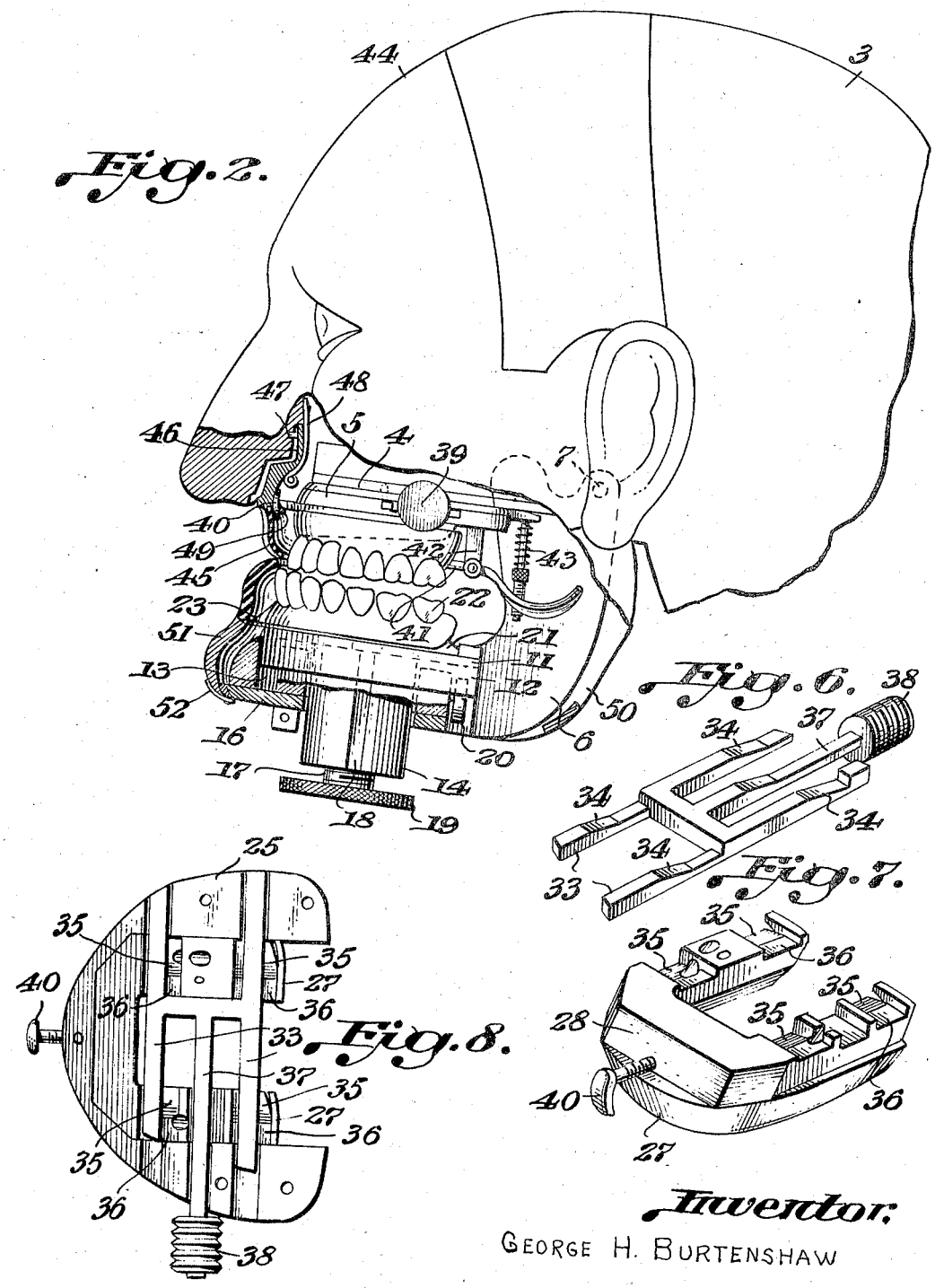

June 11, 1940.  G. H. BURTENSHAW  2,203,891
DENTURE DEMONSTRATING APPARATUS
Filed April 16, 1937  4 Sheets-Sheet 3
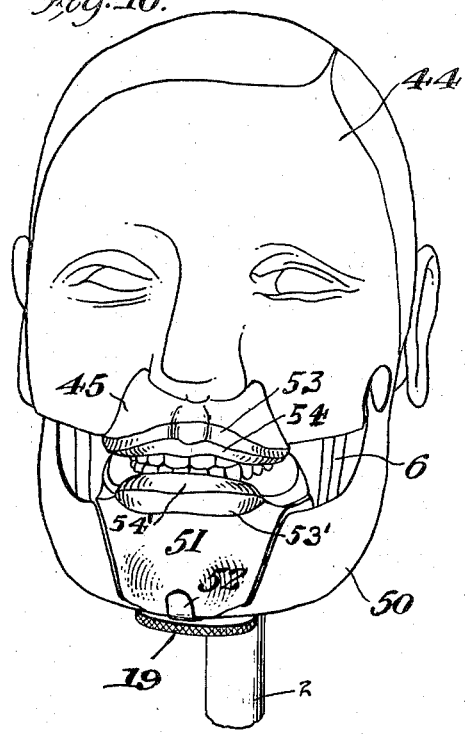
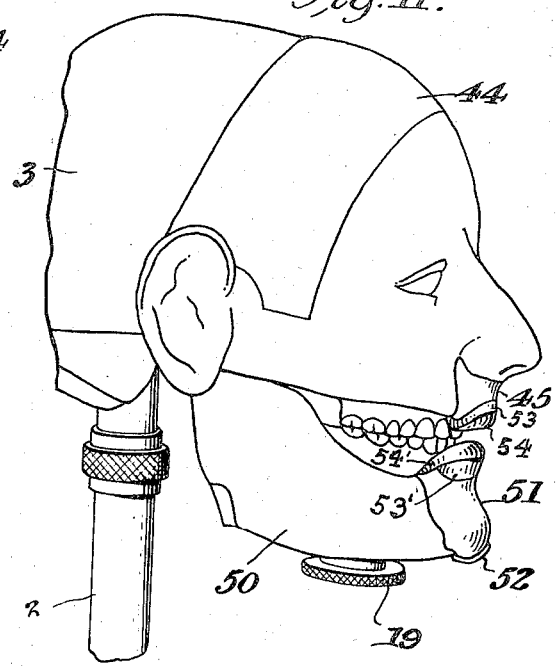
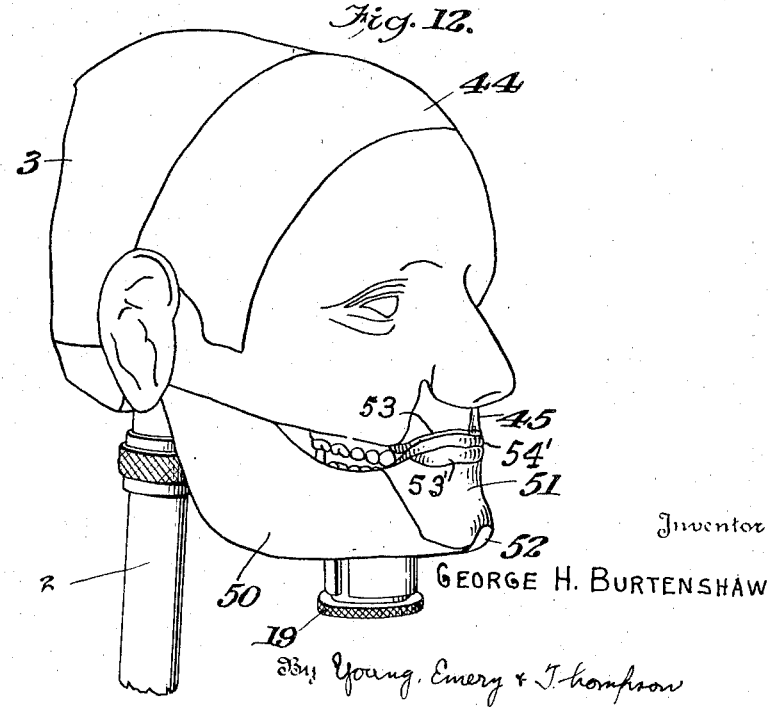
Inventor
GEORGE H. BURTENSHAW
By Young, Emery & Thompson
Attorney June 11, 1940.    G. H. BURTENSHAW    2,203,891
DENTURE DEMONSTRATING APPARATUS
Filed April 16, 1937    4 Sheets-Sheet 4
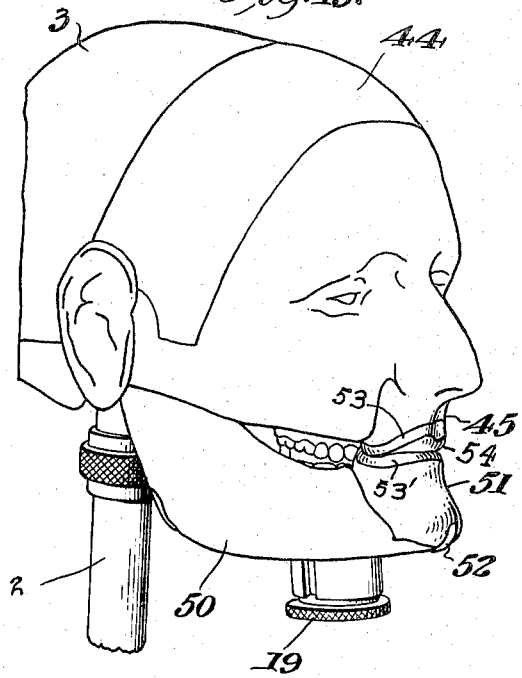
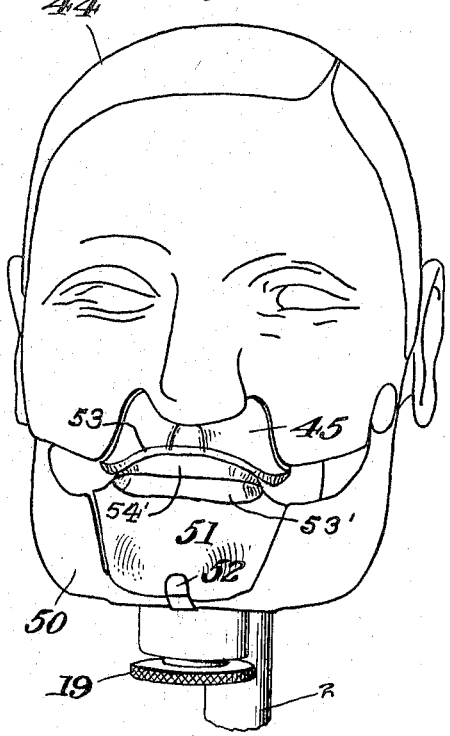
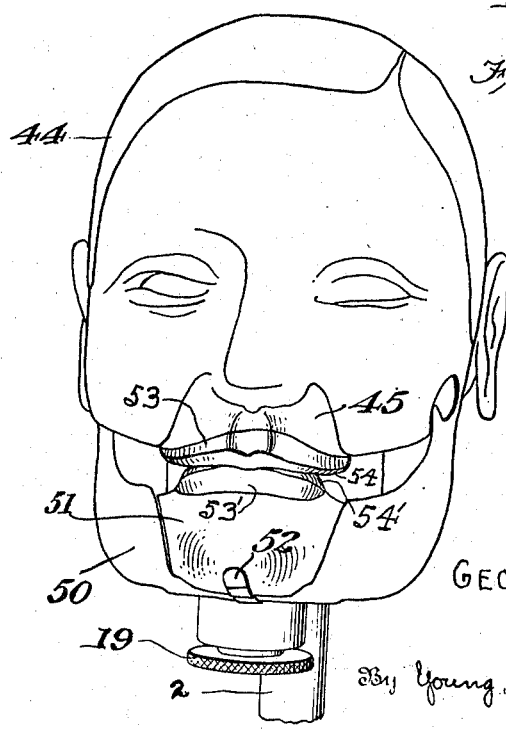
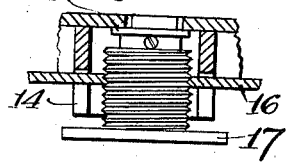
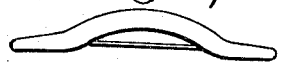
Inventor
GEORGE H. BURTENSHAW
By Young, Emery & Thompson
Attorneys Patented June 11, 1940

2,203,891

UNITED STATES PATENT OFFICE 2,203,891

DENTURE DEMONSTRATING APPARATUS

George Henry Burtenshaw, Taumarunui, New Zealand

Application April 16, 1937, Serial No. 137,341

13 Claims. (Cl. 32—71)

The present invention relates to denture demonstrating devices, and more particularly has reference to devices for demonstrating the effects of gum shrinkage on the facial expression of a person having artificial dentures.

The structure herein disclosed is an improvement on the structure shown in my application, co-pending with this application, Serial No. 36,603, filed August 16, 1935, and now ripened into Patent No. 2,103,058, dated December 21, 1937.

An object of this invention is to provide a device for demonstrating the changes in the facial expression of a person having artificial dentures due to shrinkage of the human gums.

Another object of this invention is to provide a device simulating a human face, including movable upper and lower lips, supports for artificial dentures, and means for displacing said supports to correspond to the displacement of the human gums upon shrinkage thereof.

A further object of this invention is to provide a device comprising an upper jaw frame, an artificial denture support carried by said jaw frame, means for guiding and moving said support to simulate the shrinkage of the human gums, a lower jaw frame pivotally mounted on the upper frame, a lower artificial denture support carried by the lower jaw frame, means for guiding and moving the lower support to simulate shrinkage of the lower gums, and facial masks carried by the upper and lower jaw frames and provided with movable lip portions adapted to be shifted by the denture supports upon movement of the latter.

Still another object of this invention is to provide a denture tray having a denture foundation carried thereby, means for displacing said foundation, and means for guiding said foundation in a rearward direction toward said tray to simulate shrinkage of the human gums.

According to the invention, the denture demonstrating device comprises a member simulating an upper jaw and a member simulating a lower jaw, the lower jaw pivotally carried by the upper jaw, a facial mask carried by the upper jaw member, a lower jaw mask carried by the lower jaw member, each mask having lip portions displaceable inwardly, an upper denture carrier mounted on the upper jaw member and having means for moving the same to simulate the shrinkage of the human gums, means connecting the upper denture carrier to the lip of the upper mask, so that said lip will shift in correspondence to the displacement of said carrier, a lower denture carrier mounted on the lower jaw member and having means for moving same in relation to said jaw member to simulate the shrinkage of the lower gum, and means engaging the lip of the lower mask to hold said lip against said lower denture, whereby it will shift in correspondence with the displacement of said lower carrier.

The drawings illustrate an embodiment of the invention and the views therein are as follows:

Figure 1 is a side elevation partly in section of a device according to the present invention, showing the parts in position prior to adjustment to indicate shrinkage of the gums.

Fig. 2 is a view similar to Fig. 1, showing the parts in position after adjustment to indicate shrinkage of the gums.

Fig. 3 is a bottom view of an upper denture tray for attachment to the upper jaw frame.

Fig. 4 is a sectional view taken on line 4—4 of Fig. 3.

Fig. 5 is a sectional view taken on line 5—5 of Fig. 3.

Fig. 6 is a perspective view of the actuating wedge.

Fig. 7 is a perspective view of the denture foundation.

Fig. 8 is a top view of the denture tray with the upper plate removed.

Fig. 9 is a sectional view taken on line 9—9 of Fig. 3.

Fig. 10 is a front view of the device of Fig. 1.

Fig. 11 is a perspective view of the device of Fig. 1.

Fig. 12 is a perspective view of the device of Fig. 2.

Fig. 13 is a view similar to Fig. 12 with the upper lip in normal position.

Fig. 14 is a front view of the device of Fig. 2.

Fig. 15 is a view similar to Fig. 14 with the upper lip in normal position.

Fig. 16 is a vertical sectional view of the lower denture carrier and its operating means, and Fig. 17 is a fragmentary lower plan view of the upper lip showing the cross bar for connecting said lip to the upper denture carrier.

The present invention differs from that shown and described in my aforementioned co-pending application in the provision of an upper facial mask fitted with a movable lip on the upper jaw frame, and a lower mask fitted with a movable lip on the lower jaw frame. Another difference resides in the provision of an upper denture tray having a denture foundation or support mounted for movement rearwardly and upwardly to simulate the shrinkage of the upper gums.

In describing the present invention, only such of the structural details of the aforementioned co-pending application as are necessary to enable an understanding of the invention have been set forth. All other details may be found in my prior application.

Referring to the drawings, the device comprises a frame 1 mounted on a standard 2. Frame 1 has a skull 3 mounted thereon which serves as a support for a mask to be described hereinafter. Frame 1 also carries a plate 4 for detachably supporting an upper denture tray 5.

A lower jaw frame 6 is mounted on the upper jaw frame for pivotal movement about point 7, as described in the aforementioned co-pending application. The lower jaw frame is urged to a closed positon by means of a spring 8 extending between a rod 9 carried by the lower jaw frame and an upright member 10 carried by upper jaw frame 1.

The lower jaw frame 6 is provided with means for adjustably supporting a lower denture, as described in my aforementioned co-pending application. This means comprises a lower carrying plate 11 provided with a downwardly extending peripheral flange 12, which is let into a recess 13 formed in the upper surface of the lower jaw frame. Plate 11 is mounted in frame 6 in a manner such that its surface level in relation thereto may be adjusted to different points while maintaining the plate parallel to the jaw frame. For this purpose, plate 11 is provided with a hollow boss 14 projecting from its underside, which is slidably mounted in a guide bearing member 15 carried by the bottom 16 of the lower jaw frame 6. A screw-threaded member 17 is arranged within the hollow boss 14 to freely rotate therein and threadedly engage a threaded opening in the bottom 16, a portion of which extends through slots 18, as described in my aforementioned application. The other details of the mechanism for raising and lowering plate 11 are also described in said prior application. It suffices to state that by rotating the knob 19, the plate 11 may be raised and lowered relatively to lower jaw frame 6 and that plate 11 may be secured in adjusted positions by means of set screw 20.

A denture tray 21 is attached to plate 11 in a suitable manner, as described in my prior application. Denture tray 21 supports a lower denture 22 and has a forward projection 23 adapted to engage the lower lip of the manikin, as will be described hereinafter.

The upper denture tray 5, shown in detail in Figs. 3 to 9, comprises a base plate 24 provided with means for attaching it to plate 4, as described in my prior application. Secured to base plate 24 is a marginal plate 25 and a central plate 26. Plates 25 and 26 cooperate to form a U-shaped recess in which the U-shaped gum simulating denture foundation 27 is slidably mounted. As more clearly shown in Fig. 7, the portion of the foundation 27 received in the U-shaped recess between plates 25 and 26 is of reduced cross-section and the forward part thereof is provided with an inclined surface 28. In Fig. 9, the relation between the inclined surface 28 of foundation 27 and the inclined surface 29 of plate 25 is clearly shown. These inclined surfaces 28 and 29 and similar surfaces between the rear portion of member 27 and plate 26 cooperate to guide said foundation 27 for movement in an inclined forward downward and rearward upward direction.

Sockets 30 are formed in each side of member 27 to receive springs 31 held in place and loaded by screws 32. One end of each spring 31 engages the head of screw 32 and the other end engages a shoulder for resiliently urging the foundation 27 toward plate 24.

Foundation 27 may be held away from plate 24 by any suitable means. One form of such means is shown in the drawings and comprises a pair of bars 33 provided with inclined surfaces 34 adapted to cooperate with inclined surfaces 35 formed in the portion of member 27 received in the recess between plates 25 and 26. Bars 33 are accommodated in notches 36 formed in member 27. These notches are of a width greater than the width of the bars to permit member 27 to be displaced forwardly and rearwardly as it is moved away from plate 24 by the wedging action of bars 33. The bars are guided for longitudinal sliding movement in notches provided in the surface of plate 25 which contacts plate 24. An actuating bar 37 is connected to bars 33 and extends through notches formed in member 27 and plate 25. A screw 38 is carried by the free end of bar 37 and is adapted to receive a nut 39 which, when threaded onto screw 38 and screwed into engagement with the side edge of plate 24, draws bars 33 outwardly and causes the cam surfaces 34 and 35 to displace member 27 against the action of springs 31 away from plate 24. Due to inclined surfaces 28 and 29, the foundation is also shifted forwardly during this displacement.

When the nut 39 is unthreaded from screw 38 and the bars 33 pushed inwardly, the foundation 27 is drawn toward plate 24 by the action of springs 31 and shifted rearwardly by reason of the inclined surfaces between foundation 27 and plates 25 and 26. This action simulates that which takes place upon shrinkage of the human gums.

At this point it should be noted that the displaceable foundation 27 carries a hook 40, the purpose of which will be described hereinafter.

An upper artificial denture is adapted to be received on the foundation 27 and is held in place by a retaining arm 41 carried by a standard 42 and resiliently urged against the denture tray by a spring 43.

An upper facial mask 44 is fitted onto the skull 3. This mask has fixed features, with the exception of a lip portion 45 which is pivotally mounted for inward movement. Lip 45 has a projection 46, which extends up behind the nose of the mask and is provided with pins 47. These pins are received in suitable sockets formed in the surface behind the nose. The lip is held in normal position and the pins 47 are retained in their sockets by a leaf spring 48. A loop 49, preferably of round wire (Fig. 17), is carried by the rear surface of lip 45 and is engaged by hook 40. The parts are so constructed that lip 45 is in its forward normal position when wedge bars 33 are drawn out to displace foundation 27 forward and downward, as appears in Fig. 1. However, when the foundation 27 is retracted toward plate 24 and rearwardly, the lip 45 is drawn inwardly as appears in Fig. 2.

A lower jaw mask 50 is fitted onto the lower jaw frame 6 and is provided with a lip portion 51. The latter is formed with a thin lower edge which is received between the front lower edge of the mask and a leaf spring 52. The leaf spring urges the lip 51 inwardly against the projection 23 of the lower denture foundation. In Fig. 1, the lower denture foundation 21 is in an upper normal position and the projection 23 engages lip 51 near the upper portion thereof to hold it outwardly in its normal position. When the lower denture foundation is retracted downwardly to simulate gum shrinkage, the projection 23 is lowered and the lip 51 falls inwardly, as shown in Fig. 2.

The width of the lower jaw frame 6 and mask 50 is less than that of the upper mask 44, so that the upward movement of the lower jaw frame and mask will not be impeded by engagement with the upper mask. With this construction, the lower denture will contact the upper denture, regardless of the degree of raising of the upper denture foundation and the degree of lowering of the lower denture foundation. Thus, the lower jaw will move upwardly and outwardly, whereas the lips will move inwardly upon retracting the upper and lower denture foundations, just as in the case of a person whose gums have shrunken.

As shown in the drawings, the movable lip portions 45 and 51 of the masks 44 and 50 are formed of the same material as the masks, for example, metal, with the exception of the lips proper which are formed of rubber or other suitable elastic material. The normally exposed front portions 53 and 53' of the elastic lips are preferably painted, so that they will be the same color as the masks 44 and 50. To make the manikin appear more realistic, the "red" or muccous membrane portions 54 and 54' of the lips are colored red. The reference characters 53 and 54 are applied to the upper lip 53' and 54' to the lower lip.

Figs. 10 and 11 show front and side perspective views of the device adjusted to demonstrate properly fitting upper and lower dentures with the mouth slightly open.

Figs. 12 and 14 illustrate the expression assumed by a person having artificial dentures and whose upper and lower gums have shrunken after the dentures were fitted. It will be noted that the upper lip has fallen inwardly and that the lower jaw is protruding. This causes the lower lip to project outwardly beyond the upper lip. Another point to be noted is that the distance between the nose and the chin is much less than in the normal case of Figs. 10 and 11. This facial disfiguration is undesirable and can be corrected by the fitting of dentures made to compensate the gum shrinkage.

Figs. 13 and 15 illustrate a case in which shrinkage has taken place only in the lower gums, for instance, where the upper denture is natural or is a properly fitted artificial denture. While this situation does not appear as bad as that of Fig. 12, it will be noted that the lower jaw protrudes and the lower lip has fallen in to give an undesirable appearance.

From the foregoing, it will be appreciated that the present invention provides a highly useful device for demonstrating the actual effects of artificial dentures which, due to gum shrinkage, do not properly fit.

Of course, the denture demonstrating apparatus illustrated and described herein may be modified and changed in various ways without departing from the invention herein set forth and hereafter claimed.

The invention is hereby claimed as follows:

1. A device for demonstrating the effect on the facial expression of shrinkage of human gums fitted with artificial dentures, comprising a member simulating the upper jaw, a member simulating a lower jaw pivotally carried by the upper jaw member, a facial mask carried by the upper jaw member, a lower jaw mask carried by the lower jaw member, each mask having lip portions displaceable inwardly, an upper denture carrier mounted on the upper jaw member for upward movement on said member to simulate the shrinkage of the human gums, means connecting said upper denture carrier to the lip of the upper mask so that said lip will be positively drawn inwardly in correspondence to the inward displacement of said carrier, a lower denture carrier mounted on the lower jaw member for downward movement on said member simulating the shrinkage of the gums, and means engaging the lip of the lower mask to hold said lip in positions corresponding to displacement of said lower carrier.

2. A device for demonstrating the effect on the facial expression of shrinkage of human gums fitted with artificial dentures, comprising a manikin having an upper jaw member, a lower jaw member pivoted to the upper jaw member, an upper lip member mounted on the upper jaw member for movement inwardly from a normal position, a lower lip member mounted for movement inwardly from a normal position, an upper foundation for an upper artificial denture mounted on the upper jaw, means for moving said foundation to simulate gum shrinkage, means connecting the foundation to the upper lip to cause the latter to move with the foundation, a lower denture foundation carried by the lower jaw member, means for displacing said lower foundation downwardly to simulate gum shrinkage, and means carried by the lower foundation for holding the lower lip in normal position and allowing said lip to fall inwardly upon downward movement of the lower denture foundation.

3. A device for demonstrating the effect on the facial expression of shrinkage of human gums fitted with artificial dentures, comprising a manikin having an upper jaw member, a lower jaw member pivoted to the upper jaw member and resiliently urged to a closed position, an upper lip member mounted on the upper jaw member for movement inwardly from a normal position, a lower lip member mounted for movement inwardly from a normal position, upper and lower artificial denture foundations carried by the upper and lower jaw members respectively, manually operable means for retracting said upper denture foundation upwardly towards the upper jaw member and the lower denture downwardly towards the lower jaw member to simulate gum shrinkage and allow the lower jaw to move closer to the upper jaw member, means operable upon retraction of the upper denture foundation to displace the same inwardly and means connecting the upper denture foundation to the underlip for imparting inward movement to said upper lip upon displacement of the upper foundation.

4. A device for demonstrating the effect on the facial expression of shrinkage of human gums fitted with artificial dentures, comprising pivoted upper and lower jaw members provided with movable lips, denture supporting means carried by each jaw member and cooperating with the movable lips, means for retracting said upper and lower denture supporting means upwardly and downwardly respectively toward the respective jaw members to simulate gum shrinkage and allow the lower jaw to move closer to the upper jaw, and means on the upper of said supporting means to draw the upper lip inwardly.

5. A device for demonstrating the effect on the facial expression of shrinkage of human gums fitted with artificial dentures, comprising a member simulating the upper jaw, a member simulating a lower jaw pivotally carried by the upper jaw member, means urging the lower jaw toward the upper jaw, a denture support carried by each jaw, dentures on said supports engaging each other to limit the movement of the lower jaw toward the upper jaw, and other means for displacing said upper and lower supports upwardly and downwardly respectively toward the respective jaws to simulate gum shrinkage and to allow the lower jaw to move closer to the upper jaw and to a protruding position.

6. A device for demonstrating the effect on the facial expression of shrinkage of human gums fitted with artificial dentures, comprising a member simulating the upper jaw, a member simulating a lower jaw pivotally carried by the upper jaw member, means urging the lower jaw toward the upper jaw, a denture support carried by each jaw, dentures on said supports engaging each other to limit the movement of the lower jaw toward the upper jaw, means for displacing said supports toward the respetive jaws to simulate gum shrinkage and to allow the lower jaw to move closer to the upper jaw and to a protruding position, a lip-like member carried by each jaw, and means extending between said denture supports and lips to effect an inward movement of the lips upon displacing said support to a shrunken gum position.

7. A demonstrating and adjusting device for artificial dentures, comprising an upper jaw frame, an upper denture, means for mounting said denture in position on said frame, a lower jaw frame, means for pivotally mounting said lower jaw frame on the upper jaw frame to simulate the human jaw structure, a lower denture carried by the lower jaw frame, means for freely adjusting the position of the lower denture in a substantially vertical direction relatively to said lower jaw frame, guiding means for confining the movement of the lower denture to a fixed substantially vertical direction relatively to the lower jaw frame while maintaining the initial occlusal surface alignment of the lower denture relatively to the lower jaw frame to simulate the displacement of an artificial lower denture in the human mouth upon shrinkage of the lower gums, a mask for the lower jaw provided with a lip member, and means associated with said lower denture for holding the lip in a normal position when the denture is in a normal position and for allowing said lip member ti fall inwardly when said denture is displaced to a shrunken gum position.

8. A denture tray for use in an artificial denture demonstrating and adjusting device, a denture foundation carried by said tray for supporting an artificial denture, means for guiding said foundation for movement in a fixed direction inclined relatively to the plane of the tray rearwardly toward and forwardly away from the tray while maintaining the supporting surface of said foundation always in planes substantially parallel to each other, and means for displacing said foundation to desired positions.

9. A denture tray for use in an artificial denture demonstrating and adjusting device, a denture foundation carried by said tray for supporting an artificial denture, means for guiding said foundation for movement in a fixed substantially inclined direction rearwardly toward and forwardly away from said tray, while maintaining the supporting surface of said foundation always in planes substantially parallel to each other, means urging said foundation toward said tray to simulate gum shrinkage, and means for displacing said foundation to positions away from said tray to simulate the form of the human gums prior to shrinkage.

10. An apparatus for demonstrating effects on facial expression of shrinkage of human gums fitted with artificial dentures, comprising a member simulating the upper jaw, a member pivotally mounted on the upper jaw member to simulate the lower jaw, masks carried by each of said jaw members, a foundation member in each of said jaws, a denture carried by each of said foundation members, and separate means for independently moving said dentures in general vertical directions relative to said jaws while maintaining their horizontal planes.

11. An apparatus for demonstrating effects on facial expression of shrinkage of human gums fitted with artificial dentures, comprising a member simulating the upper jaw, a member pivotally mounted on the upper jaw member to simulate the lower jaw, masks carried by each of said jaw members, lip portions carried by each of said masks and displaceable inwardly, a foundation member in each of said jaws, a denture carried by each of said foundation members, and separate means for independently moving said dentures in general vertical directions relative to said jaws while maintaining their horizontal planes.

12. An apparatus for demonstrating effects on facial expression of shrinkage of human gums fitted with artificial dentures, comprising a member simulating the upper jaw, a member pivotally mounted on the upper jaw member to simulate the lower jaw, masks carried by each of said jaw members, a foundation member in each of said jaws, a denture carried by each of said foundation members, and wedge means for moving the upper denture from said upper jaw while maintaining same in a horizontal plane.

13. A device for demonstrating the effect on facial expression of shrinkage of human gums fitted with artificial dentures, comprising a manikin having an upper jaw member, a lower jaw member pivoted to the upper jaw member and resiliently urged to a closed position, an upper lip member mounted on the upper jaw member for moving inwardly from a normal position, a lower lip member mounted for movement inwardly from a normal position, upper and lower artificial denture foundations carried by the upper and lower jaw members respectively, manually operable means for retracting said denture foundations away from each other to simulate gum shrinkage and allow the lower jaw to move closer to the upper jaw member, and hook means on the upper foundation connecting said upper lip upon displacement of the foundations, and spring means engaging the lower lip for imparting inward movement to said lower lips.

GEORGE HENRY BURTENSHAW.